United States Patent [19]

Renken et al.

[11] 4,344,330
[45] Aug. 17, 1982

[54] AVERAGE FLUID FLOW SENSOR

[75] Inventors: Michael J. Renken, Chaseburg; Billy P. Simmons, La Crosse, both of Wis.

[73] Assignee: The Trane Company, La Crosse, Wis.

[21] Appl. No.: 234,284

[22] Filed: Feb. 13, 1981

[51] Int. Cl.³ .............................................. G01F 1/46
[52] U.S. Cl. ................................................. 73/861.66
[58] Field of Search ........... 73/861.61, 861.65, 861.66, 73/195

[56] References Cited

U.S. PATENT DOCUMENTS

| | | | |
|---|---|---|---|
| 1,508,017 | 9/1924 | Greve | 73/861.66 |
| 1,702,274 | 2/1929 | Schmidt | 73/861.66 |
| 2,828,076 | 3/1958 | Donahue | 73/861.66 |
| 3,129,587 | 4/1964 | Hallanger | 73/211 |
| 3,355,946 | 12/1967 | Lazell | 73/861.65 |
| 3,449,954 | 6/1969 | Brown | 73/861.65 |
| 3,581,565 | 6/1971 | Dieterich | 73/861.66 |
| 3,759,098 | 9/1973 | Logsdon et al. | 73/205 |
| 4,290,315 | 9/1981 | Groberg | 73/861.61 |

OTHER PUBLICATIONS

Shortridge Instrument Inc. Brochure "Flowhood The Proven Standard of Accuracy".
Anemostat Products Division/Dynamics Corporation of America Catalog No. 76VF.

*Primary Examiner*—Herbert Goldstein
*Attorney, Agent, or Firm*—Carl M. Lewis; Ronald M. Anderson

[57] ABSTRACT

A sensor for providing a differential pressure signal indicative of the average relative rate of flow of a fluid through a duct. Two tubular members are provided, each of which are formed in a loop oriented transverse to the fluid flow and each having a plurality of spaced-apart orifices along their length. In one of the tubular members, the orifices face upstream toward the impinging fluid flow; in the other, the orifices face downstream. The difference between the pressures developed within the two tubular members as a result of the orientation of these orifices relative to fluid flow is indicative of the average rate of fluid flow in the duct.

6 Claims, 5 Drawing Figures

AVERAGE FLUID FLOW SENSOR

DESCRIPTION

1. Technical Field

This invention generally pertains to a fluid flow sensor and in particular to a low cost flow sensor which produces a differential pressure signal indicative of the average rate of fluid flow in a duct.

2. Background Art

Measurement of volumetric fluid flow through a conduit or duct typically involves the use of a flow restriction device such as an orifice plate or weir which is placed in the duct transverse to the fluid stream, creating a pressure differential between measurement points located upstream and downstream of the restriction. This differential pressure is indicative of the rate of fluid flow. Since turbulent or swirling fluid flow may introduce fluctuations and errors in the measurement, either a relatively long straight section of duct is required immediately upstream of the measurement points or else a flow straightening device must be provided to minimize turbulence.

Flow sensors are often integrated into the controls of air conditioning systems. Since many such sensors may be required in the air conditioning system of a large building, they should be low in cost and simple of design. Furthermore, the ideal flow sensor should be insensitive to turbulence and swirling airflow, because it is often necessary to install a flow sensor immediately downstream of an angular bend or elbow in the duct. As noted above, immediately downstream of such an angular change of direction, the air stream has a much greater non-uniformity of flow velocity than it would in a long straight section of duct. It would be very difficult to obtain an accurate average flow rate measurement under such conditions using merely a simple weir and pitot tube sensor, since this only measures flow at a single point in the transverse cross section of the duct. When the fluid flow is not evenly distributed across the duct, a flow sensor should be capable of *averaging* the flow at several points distributed over the transverse area of the duct.

There are several averaging flow sensors in the prior art. For example, U.S. Pat. No. 3,129,587 discloses an apparatus adapted to measure the average velocity of air moving in a duct. The apparatus includes a perforated sheet to be placed in the duct with first and second pipes positioned both upstream and downstream of the perforated sheet, each pipe having a plurality of holes spaced along its length and facing upstream toward the flow. The differential pressure developed in the two pipes as a result of the pressure drop through the perforated screen is thus a measure of the flow velocity through the duct.

A second U.S. Pat. No. 3,759,098 shows a relatively large diameter orifice plate positioned transversely in a conduit, with two tubes running around the internal circumference of the conduit immediately adjacent the upstream and downstream side of the orifice plate. These tubes each include a plurality of ports located radially outward of said orifice with the ports facing inwardly toward the center of the conduit. The ports in the tube upstream of the orifice plate sense static pressure in the conduit; the ports in the tube downstream thereof sense sub-atmospheric pressure. The differential pressure between the two is thus indicative of flow through the conduit.

Both of the prior art devices referred to above create a significant pressure drop in the duct by their very presence and are significantly higher in cost than is desirable for use in a system in which *many* such flow sensing devices must be installed. For example, in a variable air volume temperature conditioning system in which the volume of air supplied to a comfort zone is a function of the temperature conditioning demand, a flow sensing unit is typically required for each variable volume flow regulator, i.e., one for each separately controlled zone. Furthermore, it is generally desirable to install a flow sensor as close as possible to the flow regulator, even if it must be located immediately downstream of an angle or elbow in the duct. For such a system, an averaging fluid flow sensor is required which has less flow impedance, and which is lower in cost than those prior art devices described hereinabove.

In consideration thereof, it is an object of the subject invention to provide means for sensing the average rate of fluid flow through a duct or conduit which are low in cost.

Another object of this invention is to provide a differential pressure signal which is indicative of the average rate of fluid flow regardless of the geometry of the duct immediately upstream of the measurement point.

A still further object of this invention is to provide a sensor which provides a signal indicative of the average rate of fluid flow at a point in a duct where the fluid flow is both swirling and turbulent, yet introduces minimal flow impedance.

These and other objects of the subject invention will become apparent from the description of the preferred embodiments which follows and by reference to the attached drawings.

DISCLOSURE OF THE INVENTION

The subject invention is a sensor for producing a differential pressure signal which is indicative of the average rate of flow of a fluid through a duct and is adapted for connection to a device which is responsive to differential pressure as an indication of fluid flow rate. The sensor comprises first and second tubular members disposed within a duct, each of which is generally formed in a loop. The loops are congruent and oriented transverse to the direction of fluid flow through the duct so that they encompass a substantial portion of the transverse cross-sectional area of the duct. Also provided are means for supporting the first and second tubular members. A plurality of orifices are disposed in spaced apart relationship along the length of each of the tubular members, with the orifices in the first tubular member facing upstream and the orifices in the second tubular member facing downstream of the fluid flow. Fluid flowing in the duct thus impinges directly on the orifices in the first tubular member developing an average fluid pressure inside that member which is substantially greater than the average fluid pressure developed in the second tubular member. The resulting differential pressure between the first and second tubular members is therefore indicative of the average rate of fluid flow in the duct, and is substantially unaffected by any non-uniform distribution of flow.

DESCRIPTION OF THE PREFERRED EMBODIMENTS

Figure 1:
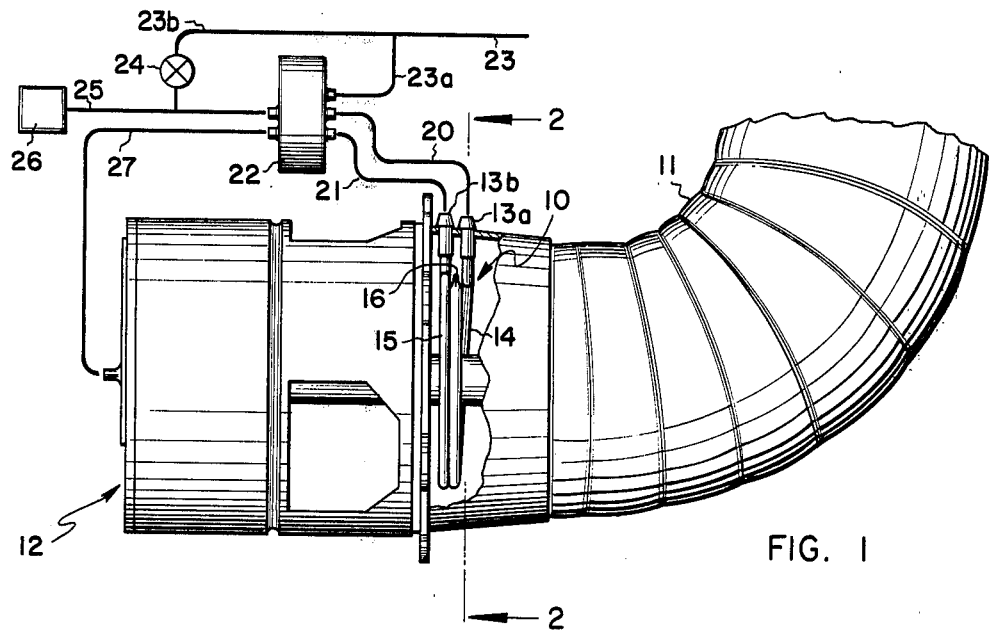
FIG. 1 is a cutaway drawing showing the subject invention installed in the inlet of a variable air volume (VAV) system fluid flow regulator.

With reference to FIG. 1, a first embodiment of the subject invention, a fluid flow sensor generally denoted by reference numeral 10 is shown disposed in a duct 11 of a variable air volume (VAV) temperature conditioning system. Sensor 10 is mounted inside duct 11 at the inlet to a VAV flow regulator valve generally denoted by reference numeral 12. Flow regulator valve 12 is used to control the flow of temperature conditioned air through duct 11 into a comfort zone (not illustrated) as a function of the temperature in that zone. Details of the operation of flow regulator valve 11 may be had by reference to U.S. Pat. No. 4,082,114, but are not explained herein since they are not pertinent to the operation of the flow sensor 10.

As is often true of a typical temperature conditioning duct system, duct 11 is shown in FIG. 1 as making an abrupt turn, approaching 90°, immediately upstream of the location of sensor 10. The curvature of duct 11 introduces substantial turbulence and swirling of the airflow therethrough at the inlet of VAV flow regulator valve 12. Duct 11 is typically installed and attached to the flow regulator valve 12 in the field. Prior to its installation, it is virtually impossible to predict the shape or routing duct 11 might take immediately upstream of a particular sensor 10. Thus, there is no practical way to tailor the shape or location of sensor 10 to a specific shape of duct 11. It is therefore necessary that sensor 10 be capable of providing a signal indicative of the average airflow rate, regardless of the cross-sectional distribution of airflow through duct 11.

The first embodiment of the fluid flow sensor 10 comprises a single continuous tube formed in two congruent circular loops, the ends of which are bent radially outward and inserted into nipples 13a and 13b which extend through the wall of the duct 11. Flow sensor 10 is divided into a first section 14 and a second section 15 by sealing means 16 comprising, in the preferred embodiment, a flattened or crimped portion in the center of fluid flow sensor 10. Sealing means 16 prevents fluid communication between first and second flow sensor sections 14 and 15. The first flow sensor section 14 further includes eight orifices disposed at spaced-apart intervals on the side of section 14 facing directly upstream toward impinging airflow. Likewise, on the downstream side of second flow sensor section 15 are provided eight additional orifices 17 disposed generally opposite their counterpart orifices 17 in the first flow sensor section 14. The orifices 17 in the second flow sensor section 15 are thus not exposed to impinging airflow, but rather lie in the "shadow" of the fluid flow sensor 10, or specifically, in the shadow of flow converging around second flow sensor section 15. Airflow impinging upon the orifices 17 which are formed in the first flow sensor section 14 cause the pressure inside section 14 to be greater than static duct pressure, whereas the pressure developed inside the second flow sensor section 14 is slightly less than static duct pressure.

The magnitude of the difference between the pressures developed in the first and second flow sensor sections 14 and 15 is of course a function of the relative rate of airflow through the duct 11. Furthermore, because orifices 17 are widely distributed across and about the transverse cross-sectional area of the duct 11, the differential pressure developed in fluid flow sensor 10 is substantially indicative of the *average* rate of airflow through that cross-sectional area.

Figure 2:
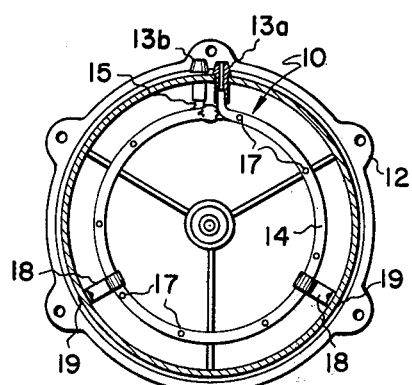
FIG. 2 is a cross-sectional view of the first embodiment of the subject invention taken along section lines 2—2 of FIG. 1.

Although fluid flow sensor 10 may be supported within duct 11 entirely by nipples 13a and 13b, mounting brackets 18 may be provided to insure that the fluid flow sensor is held securely in place. As shown in FIG. 2, mounting brackets 18 are provided at two points spaced apart from each other and from nipples 13a and 13b; suitable fasteners 19 are used to attach the mounting brackets to the inner periphery of duct 11 inside the inlet of flow regulator 12.

As an illustration of prospective use of fluid flow sensor 10, the differential pressure signal output from flow sensor 10 is shown connected by pneumatic tubes 20 and 21 in fluid communication with a reset velocity controller 22. Pneumatic tube 20 thus communicates the relatively higher pressure developed in the first flow sensor section 14 as a result in impinging airflow, to the high pressure input of reset velocity controller 22; pneumatic tube 21 communicates the lower air pressure developed in second flow sensor section 15 to the low pressure input of controller 22. The reset velocity controller is a differential pressure sensitive device. An example of such a device is the Model VCV 2100 manufactured by Universal Pneumatic Controls Inc. Controller 22 requires an air supply of approximately 20 psi, which is provided through pneumatic tubes 23 and 23a from an air compressor source which is not shown. That same 20 psi supply is also provided to pneumatic line 23b which includes therein a flow restriction orifice 24. Orifice 24 limits the flow of supply air communicated thereby to pneumatic tube 25. Tube 25 provides fluid communication between a room thermostat 26 and the thermostat input of controller 22. The pressure developed in pneumatic tube 25 is a function of the temperature in the comfort zone in which themostat 26 is placed and causes controller 22 to produce an output signal through pneumatic tube 27 which is in fluid communication with the VAV flow regulator valve 12. That output signal drives regulator valve 12 between its minimum and maximum open positions, thereby controlling the flow of air into the comfort zone. Controller 22 thus effects modulation of the airflow into the comfort zone through regulator valve 12 as a function of the signal produced by thermostat 26. Furthermore, it has the function of controlling the rate of airflow through duct 11 between preset minimum and maximum levels, where, the relative average rate of airflow through duct 11 is determined by the differential pressure it causes in fluid flow sensor 10.

In practice, fluid flow sensor 10 is formed from a 3/16 to ¼ inch O.D. thin-walled copper, plastic, or aluminum tubing with the orifices 17 having a diameter of between 0.020" to 0.045". Smaller orifices 17 may clog too easily; larger ones do not properly average fluid flow. For the first preferred embodiment of fluid flow sensor 10, the diameter of the tubing loops comprising flow sensor 10 should be such that the area inside the loop is approximately equal to the annular area enclosed by duct 11 outside the loop, as measured transversely. Although duct 11 is shown as being circular in cross section, conduit rectangular in shape is sometimes used in air conditioning duct systems, in which case fluid flow sensor 10 might also be formed in a generally rectangular-shaped loop. It should be apparent that a major benefit of this invention derives from its relatively low cost and its adaptability to use in ducts of various size and shape. Likewise, although eight orifices 17 are shown in both the first and second flow sensor sections 14 and 15, either more or less orifices 17 may be used depending upon the relative accuracy required for determination of the average rate of fluid flow.

Figure 3:
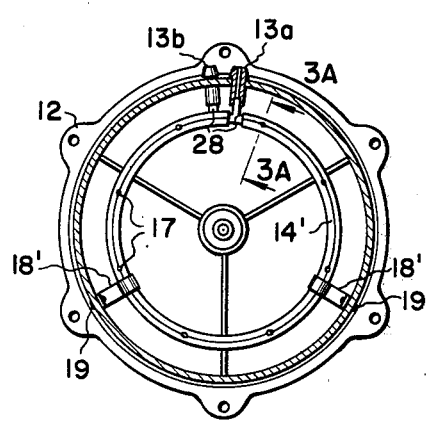
FIG. 3 shows a view equivalent to that of FIG. 2 for a second embodiment of the subject invention.
Figure 3A:
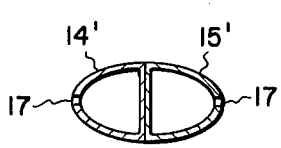
FIG. 3(a) is a cross-sectional view of the second embodiment of the subject invention.

Turning now to FIG. 3, a second embodiment of the subject invention is shown in which fluid flow sensor 10' comprises a first flow sensor section 14' and a second flow sensor section 15', each of which is formed from a tubular extrusion shaped into a loop, the ends of which are joined in fluid communication by a "T" fitting 28. The "T" fitting 28 which joins the ends of the first flow sensor flow section 14' is inserted into nipple 13a; likewise, the "T" fitting joining the ends of second flow sensor section 15' is inserted into nipple 13b. Flow sensor sections 14' and 15' are generally the same size and may be connected by an adhesive or by other suitable fastening means so that they are back-to-back as shown in FIG. 3(a). The shape of the extruded tubular sections comprising flow sensor sections 14' and 15' is generally more aerodynamic than that of the round tubing used in the first embodiment of flow sensor 10. As was the case in the first preferred embodiment of flow sensor 10, flow sensor 10' includes a plurality of orifices 17 at spaced intervals on the face of first flow sensor section 14' facing upstream and on the downstream face of second flow sensor section 15'. Also, mounting brackets 18' are provided to secure the sensor 10' within duct 11.

Although both ends of the first and second flow sensor sections 14' and 15' are shown joined by "T" fitting 28 in FIG. 3, each extruded tubular section 14' and 15' might also be sealed at one end by sealing means 15', comprising a plug or other suitable seal (not shown), or formed out of a single continuous member, as was described for the first preferred embodiment fluid flow sensor 10. In that embodiment, since there is insignificant fluid flow *inside* the first and second flow sensor sections 14 and 15, there is virtually no pressure drop between the last orifice 17 immediately adjacent the sealed end of the flow sensor sections 14 or 15 and the end inserted into nipple 13. The pressure developed within sections 14 or 15 is substantially the average of the pressures at each of the orifices 17 in the respective flow sensor sections 14 or 15. The "T" fitting 28 is therefore unnecessary to insure that an average pressure exists at the nipples 13a or 13b.

Figure 4:
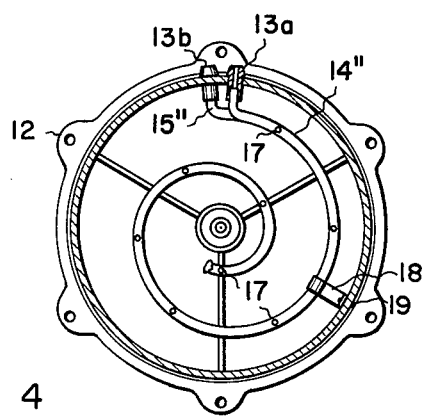
FIG. 4 shows a view equivalent to that illustrated in FIG. 2 for a third embodiment of the fluid flow sensor.

A third embodiment of the present invention is shown in FIG. 4. In this embodiment, the fluid flow sensor 10" comprises two generally congruent loops of tubing formed in a helical spiral having a decreasing radius. Flow sensor 10" may be formed either from a single continuous length of tubing which is folded back and crimped at its innermost end or from two pieces of tubing which are crimped at the end of the helix nearest the center of the duct. Again, orifices 17 are provided in both the first and second flow sensor sections 14" and 15" of the fluid flow sensor 10" on the upstream and downstream facing sides thereof, respectively. The fluid flow sensor 10" may provide a slight improvement in accurately determining the average fluid flow through duct 11, since orifices 17 of sensor 10" are more widely distributed over the transverse cross-sectional area thereof. In other respects, flow sensor 10" operates on the same principle as the other two embodiments and is likewise held in place in the duct by mounting brackets 18 and nipples 13a and 13b.

Although fluid flow sensors 10, 10', and 10" have all been described in use in an air conditioning duct for providing a differential pressure signal indicative of the rate of airflow, this invention is believed equally applicable for sensing the average relative rate of flow of other kinds of fluids, both gaseous and liquid. Furthermore, it should be apparent that the subject invention may be used with other devices sensitive to differential pressure as an indication of rate of fluid flow, besides the reset valocity controller 22 described above. It will be understood that modifications such as those noted above will be apparent to those skilled in the art within the scope of the invention, as defined in the claims which follow.

We claim:

1. A sensor for providing a differential pressure signal indicative of the average relative flow velocity of a fluid through a duct and adapted for connection to a device which is responsive to differential pressure as an indication of fluid flow rate, said sensor comprising
   a. first and second tubular members disposed with in the duct, each of which is generally formed in a loop oriented transverse to the direction of fluid flow through the duct; wherein the first and second tubular members comprise a single continuous tubular member each end of which is in fluid communication with the device responsive to differential pressure, said continuous member being sealed at an intermediate point along its length to separate the first and second tubular members defined thereby from fluid communication with each other;
   b. means for supporting said first and second tubular members within the duct; and
   c. a plurality of orifices disposed in spaced apart relationship along the length of each of the tubular members, wherein the orifices in the first tubular member face toward fluid flow impinging from upstream of the duct and the orifices in the second tubular member are disposed facing generally downstream of the fluid flow in the duct, such that the impact fluid pressure developed in the first tubular member is relatively greater than the fluid pressure developed in the second tubular member as a result of the respective orientation of the orifices in each of said tubular members, and the magnitude of this differential pressure is indicative of the average fluid flow rate in the duct.

2. The sensor of claim 1 wherein the continuous tubular member is sealed at the intermediate point along its length by being flattened over a relatively short section of its length at said point.

3. The sensor of claim 1 wherein the continuous tubular member is sealed at the intermediate point along its length by means of a plug inserted into said tubular member.

4. The sensor of claim 1 wherein the loops formed by the first and second tubular members are generally the same shape as the internal transverse cross-sectional perimeter of the duct, though smaller in size, such that substantial space separates the loop from the inner duct wall.

5. A sensor of producing a differential pressure signal indicative of the average relative flow velocity of a fluid through a duct and adapted for connection to a device which is responsive to differential pressure as an indication of fluid flow rate said sensor comprising
   a. first and second tubular members disposed within the duct, each of which is generally formed in a spiral-shaped loop oriented transverse to the direction of fluid flow through the duct;
   b. means for supporting said first and second tubular members within the duct;
   c. a plurality of orifices disposed in spaced-apart relationship along the length of each of the tubular members, with one or more of the orifices disposed therein closer to the center of the duct than other of the orifices, wherein the orifices in the first tubular member face toward fluid flow impinging from upstream of the duct and the orifices in the second tubular member are disposed facing generally downstream of the fluid flow in the duct, such that the impact fluid pressure developed is relatively greater than the fluid pressure developed in the second tubular member as a result of the respective orientation of the orifices in each of said tubular members, and the magnitude of this differential pressure is indicative of the average fluid flow rate in the duct and is substantially unaffected by a non-uniform distribution of fluid flow within the duct.

6. The sensor of claims 1 or 5 wherein the loops formed by the first and second tubular members are generally disposed in congruent relationship to each other.

* * * * *